United States Patent [19]

Yamada

[11] Patent Number: 5,657,415

[45] Date of Patent: Aug. 12, 1997

[54] APPARATUS FOR REPRODUCING MOVING PICTURES FROM MOTION PARAMETERS AND MOVING PICTURE CODING AND DECODING SYSTEM

[75] Inventor: Akio Yamada, Tokyo, Japan

[73] Assignee: NEC Corporation, Tokyo, Japan

[21] Appl. No.: 365,001

[22] Filed: Dec. 28, 1994

[30] Foreign Application Priority Data

Dec. 28, 1993 [JP] Japan ................................. 5-333991

[51] Int. Cl.$^6$ .............................. H04N 5/76; H04N 5/93
[52] U.S. Cl. ........................ 386/69; 386/70; 386/126
[58] Field of Search ................................ 358/335, 342, 358/310, 312; 348/394, 402, 407, 412, 413, 415, 416, 409–411; 360/33.1, 9.1, 10.1, 10.3, 32, 27, 72.1, 8; 386/69–70, 109, 111, 112, 125, 126; 369/32, 44.28; H04N 5/76, 5/92, 5/78, 9/79

[56] References Cited

U.S. PATENT DOCUMENTS

| | | | |
|---|---|---|---|
| 5,140,437 | 8/1992 | Yonemitsu et al. | 358/342 |
| 5,191,436 | 3/1993 | Yonemitsu | 358/335 |
| 5,305,113 | 4/1994 | Iwamura et al. | 358/335 |
| 5,377,051 | 12/1994 | Lane et al. | 360/10.3 |
| 5,450,209 | 9/1995 | Niimura et al. | 360/32 |
| 5,502,571 | 3/1996 | Decotignite et al. | 358/335 |

FOREIGN PATENT DOCUMENTS 62-68384  3/1987  Japan.

OTHER PUBLICATIONS

K. Aizawa et al., "Model–Base Analysis Synthesis Image Coding System for Very Low–Rate Image Transmission", pp. 4.3–1 and 4.3–2.

CODEC for Audiovisual Services AT n x 384 kbit/s, Recommendation H.261, (Melbourne, 1988) pp. 120–128.

*Primary Examiner*—Thai Tran
*Attorney, Agent, or Firm*—Foley & Lardner

[57] ABSTRACT

A moving picture reproduction apparatus is disclosed which can reproduce successive moving pictures representing an appropriate movement only by extracting, from within motion information inputted as fragmentary movements, a small number of particular motion parameters of such movement as, for example, a turning movement of the face of a person or a movement of the mouth. The moving picture reproduction apparatus comprises a motion parameter extraction circuit for extracting a motion parameter from motion information of an inputted picture, a video sequence storage circuit for storing a plurality of video sequences which are series of moving pictures individually corresponding to a plurality of motion parameters, and a moving picture production circuit for reading out, in accordance with the motion parameter extracted by the motion parameter extraction means, a corresponding video sequence from the video sequence storage means and producing a reproduced moving picture from the video sequence.

8 Claims, 5 Drawing Sheets

APPARATUS FOR REPRODUCING MOVING PICTURES FROM MOTION PARAMETERS AND MOVING PICTURE CODING AND DECODING SYSTEM

BACKGROUND OF THE INVENTION

1. Field of the Invention

This invention relates to a moving picture reproduction apparatus and a moving picture coding and decoding system which employs a moving picture reproduction apparatus.

2. Description of the Related Art

Conventionally, a moving picture is usually coded and decoded using motion compensation interframe prediction processing. As an example, in the coding and decoding system H.261 for a moving picture standardized by the ITU-T (International Telecommunication Union-Telecommunication Standardization Sector), an input picture is divided into blocks of 16 picture elements×16 lines and motion compensation interframe prediction is performed in units of one block using a reference picture. As the reference picture, a decoded picture obtained in the inside of a decoding apparatus by decoding coded picture data transmitted last thereto is used. Auxiliary information which has been used in the motion compensation interframe prediction and an error signal obtained in the prediction are coded and transmitted.

With the coding and decoding system described above, however, since auxiliary information used in motion compensation and a prediction error signal are transmitted to the decoder side, where the transmission capacity is small, coded picture data cannot be transmitted sufficiently. Consequently, there is a problem in that a decoded picture suffers from significant degradation in picture quality or the frame rate of the decoded picture exhibits significant degradation.

Meanwhile, according to a "picture communication system" disclosed in Japanese Patent Laid-Open Application No. Showa 62-068384, a component constituting an object such as the face or an arm is extracted from an input picture, and a difference between the thus extracted component and standard part data held in a data base in advance is coded into and transmitted as a characteristic parameter or parameters. On the decoder side, a plurality of standard part data are transformed with the characteristic parameter or parameters and combined to compose a reproduced picture.

With the "picture communication system", however, although it can be realized with a small transmission capacity since only extracted parameters are coded and transmitted, since standard part data prepared in advance are transformed to obtain a reproduced picture, it is disadvantageous in that a delicate characteristic of an input picture cannot be represented sufficiently and the reproduced picture gives an artificial and unnatural feeling.

Further, a "coding and decoding method and apparatus for a moving picture" has been proposed which can decode and reproduce a picture most similar to an input picture even where the transmission capacity is small. In the "coding and decoding method and apparatus for a moving picture", an input picture at present is analyzed and compared with a plurality of input pictures, which have been coded and decoded in the past, to determine whether the input picture should be coded. If it is determined that the input picture should not be coded, then selection information for selecting one of the compared input pictures in the past which resembles the input picture most is transmitted to the decoder side. On the decoder side, coded data of coded input pictures are decoded and displayed and are recorded and held in advance, and when the selection information is received, one of the thus held coded input pictures which corresponds to the received selection information is selectively decoded and displayed.

With the "coding and decoding method and apparatus for a moving picture", however, since an input picture is analyzed to extract a parameter or parameters representing a characteristic or characteristics of the input picture and the thus extracted parameter or parameters are compared with parameter information in the past held by the coder side, not only it is necessary for the coder side to hold parameters of all of images which have been coded in the past, but also the processing for searching out a parameter or parameters of most high fidelity is complicated. Further, this method is not compatible with interframe predictive difference coding apparatus which are used most widely at present.

SUMMARY OF THE INVENTION

It is an object of the present invention to provide a moving picture reproduction apparatus which can reproduce successive moving pictures representing an appropriate movement only by extracting, from within motion information inputted as fragmentary movements, a small number of particular motion parameters of such movement as, for example, a turning movement of the face of a person or a movement of the mouth.

It is another object of the present invention to provide a moving picture reproduction apparatus which is compatible with existing interframe predictive coding apparatus.

It is a further object of the present invention to provide a moving picture coding and decoding system which allows transmission and recording of a moving picture with a very small amount of information.

In order to attain the objects described above, according to an aspect of the present invention, there is provided a moving picture reproduction apparatus, which comprises motion parameter extraction means for extracting a motion parameter from motion information of an inputted picture, video sequence storage means for storing a plurality of video sequences which are series of moving pictures individually corresponding to a plurality of motion parameters, and moving picture production means for reading out, in accordance with the motion parameter extracted by the motion parameter extraction means, a corresponding video sequence from the video sequence storage means and producing a reproduced moving picture from the video sequence.

Where the input data are a moving picture data string which includes motion information in coded data thereof, the moving picture reproduction apparatus further comprises means for analyzing the inputted moving picture data string to extract only the motion information included in the moving picture data string while abandoning the other information of the moving picture data string.

According to another aspect of the present invention, there is provided a moving picture coding and decoding system, which comprises a coder including motion parameter extraction means for extracting a motion parameter from object information of an inputted picture, and a decoder including video sequence storage means for storing a plurality of video sequences which are series of moving pictures individually corresponding to a plurality of motion parameters, and moving picture production means for reading out, in accordance with the motion parameter extracted by the motion parameter extraction means, a corresponding video sequence from the video sequence storage means and producing a reproduced moving picture from the thus read out video sequence.

In order to newly produce a video sequence, which has not been registered as yet, and store it into the video sequence storage means, the coder further includes picture coding means for coding a picture included in inputted object information, and the decoder includes requesting means for requesting the video sequence to be stored into the video sequence storage means to the picture coding means, and picture decoding means for decoding the video sequence coded by the picture coding means and storing the thus decoded video sequence into the video sequence storage means.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 1:
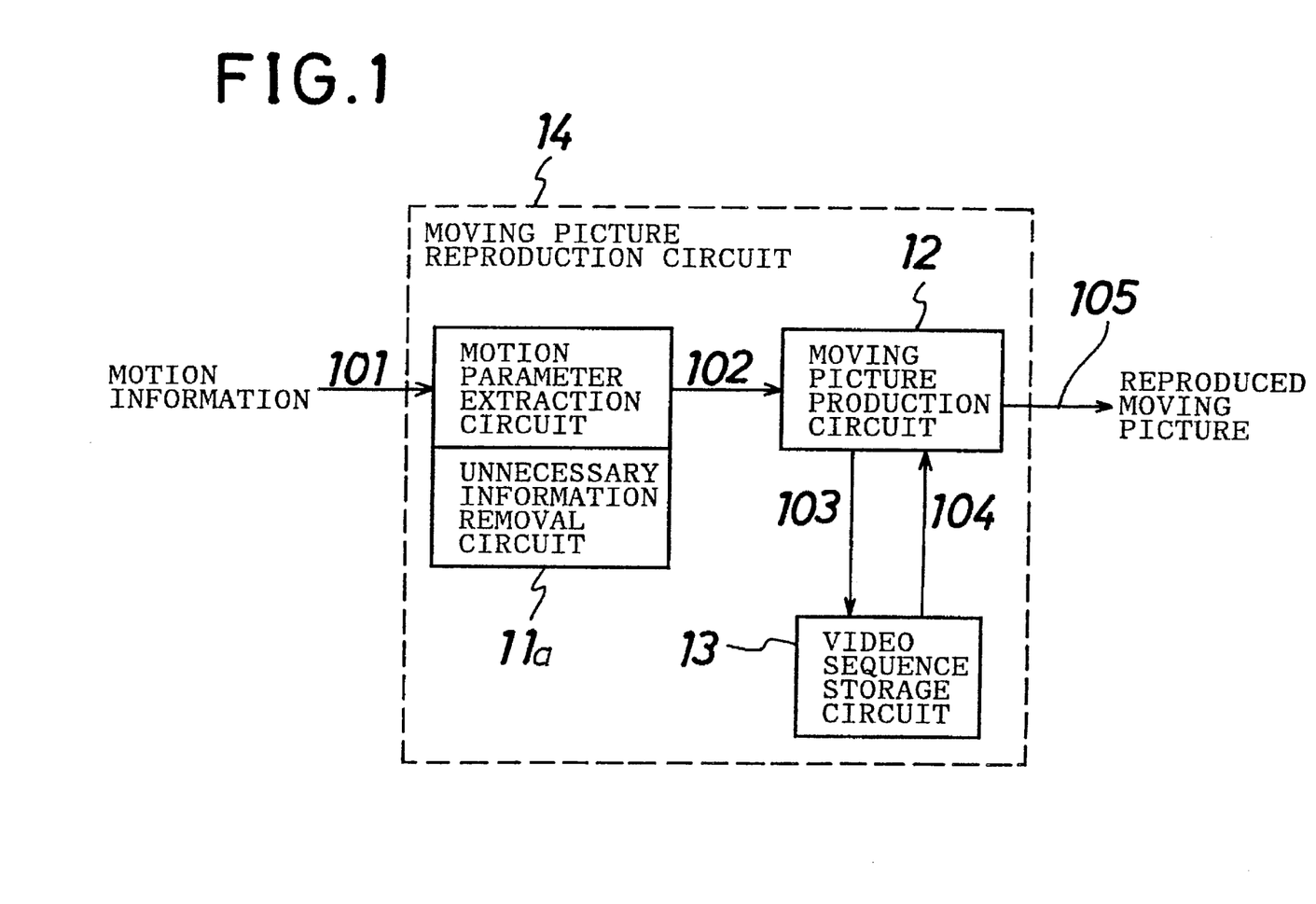
FIG. 1 is a block diagram showing a moving picture reproduction apparatus to which the present invention is applied.

Referring first to FIG. 1, there is shown a moving picture reproduction apparatus to which the present invention is applied. The moving picture reproduction apparatus shown includes a moving picture reproduction circuit 14 which successively reproduces a moving picture 105 from motion information 101 inputted as fragmentary movements thereto. The moving picture reproduction circuit 14 includes a motion parameter extraction circuit 11 for extracting a principal motion parameter or parameters 102 from the motion information 101, a video sequence storage circuit 13 including a large capacity storage medium such as a hard disk apparatus for storing a plurality of video sequences which are various series of moving pictures, and a moving picture production circuit 12 for reading out necessary data from the video sequence storage circuit 13 in accordance with a motion parameter or parameters 102 extracted by the moving picture production circuit 12 and reproducing a moving picture using the thus read out data.

Figure 5:
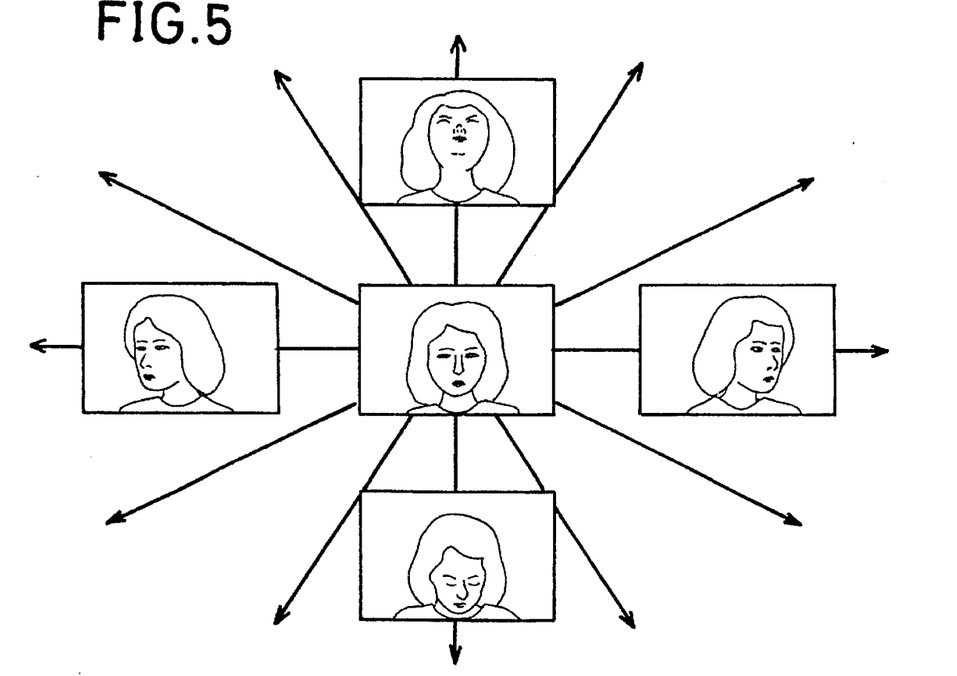
FIG. 5 is a schematic view illustrating storage of turning motion of the face in twelve video sequences into a video sequence storage circuit.
Figure 6:
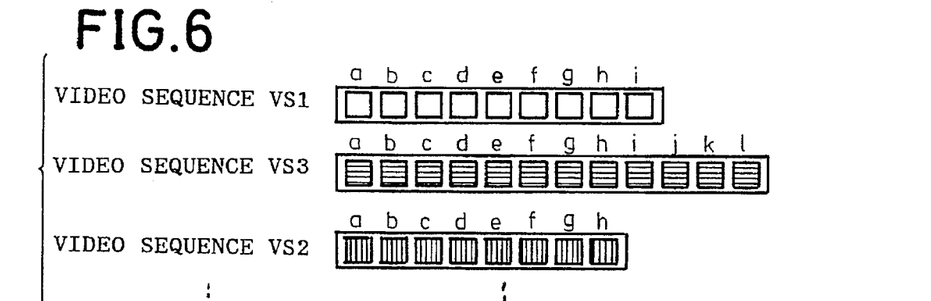
FIG. 6 is a diagrammatic view of a plurality of video sequences stored in the video sequence storage circuit.

In the video sequence storage circuit 13, various moving pictures necessary to reproduce a moving picture are stored as video sequences for individual motion parameters. For example, where the application of the moving picture reproduction apparatus is limited, for example, to a television telephone, series of movements of pictures of the upper halves of the bodies of persons upon turning to the right, turning to the left or uttering are stored in a classified condition. Further, taking only the variation in orientation of the face of a person as an example, movements of turning the face from the position directed forwardly to twelve different directions as illustrated in FIG. 5 are stored in twelve video sequences for the individual directions in the video sequence storage circuit 13. FIG. 6 schematically shows a plurality of video sequences stored in the video sequence storage circuit 13. Referring to FIG. 6, video sequences VS1, VS2, VS3, . . . represent moving pictures different from one another and are stored in the video sequence storage circuit 13 together with respective video sequence numbers applied thereto. Each of the video sequences includes a large number of frames a, b, c, d, . . . each in the form of a still picture, and the frames are stored in the video sequence storage circuit 13 together with respective frame numbers applied thereto. For example, the video sequence VS1 includes moving pictures in which the face turns to the right; the video sequence VS2 includes different moving pictures in which the face turns to the left; and the video sequence VS3 represents further moving pictures in which the face turns to just above.

Referring back to FIG. 1, motion information 101 is inputted to the motion parameter extraction circuit 11, by which a small number of motion parameters 102 necessary to reproduce a picture are extracted from the motion information 101. The motion parameters 102 are, in the case of the television telephone described above, parameters representing movements of the upper half of the body such as a turning movement of the upper half of the body to the right, a turning movement of the upper half of the body to the left or an opening movement of the mouth. Such movement parameters may be extracted by a method wherein an object within a changing picture is specified and movements of parts corresponding to the object are averaged or another method wherein only a movement of a characteristic part such as the face or an arm in a changing picture is selected and extracted as motion parameters 102. It is to be noted that the motion parameter extraction circuit 11 may include an unnecessary information removal circuit 11a for removing, in addition to extraction of particular motion parameters 102 from within the motion information 101, fine movements unnecessary for reproduction from within the motion information 101.

The moving picture production circuit 12 controls reading out from the video sequence storage circuit 13 in accordance with the motion parameters 102 outputted from the motion parameter extraction circuit 11 to produce a moving picture 105. In particular, the moving picture production circuit 12 produces, in accordance with the motion parameters 102, a read control signal 103 which represents which frame of which video sequence is required, and sends the read control signal 103 to the video sequence storage circuit 13. The video sequence storage circuit 13 selects a corresponding one or a plurality of corresponding ones of the various video sequences stored in the large capacity storage medium such as a hard disk apparatus in response to the read control signal 103, and retrieves and outputs one or a plurality of frames from the thus selected video sequence or sequences. Such reading operation is performed each time a read control signal 103 is sent thereto from the moving picture production circuit 12, and a plurality of frames can be read out for each one reading out operation. A set of frames read out in one reading out operation will be hereinafter referred to as read sequence 104. The moving picture production circuit 12 composes a read sequence 104 outputted thereto from the video sequence storage circuit 13 to reproduce a moving picture. When motion parameters 102 are given to a movement of an entire object, a read sequence 104 up to a scene designated by the motion parameters 102 is read out and composed with the reproduced moving picture reproduced till then.

For example, taking reproduction of a turning movement of the face as an example, if the motion information 101 represents a turning movement of the face from a position turned by 5° to the right further by 10° and the extracted motion parameters 102 represent "turning the orientation of the face by 10° to the right", the moving picture production circuit 12 detects to which frame number of which video sequence number in the plurality of video sequences stored in the large capacity storage medium the scene in which the face turns by 15° to the right corresponds, and reads out scenes up to the scene in which the face turns by 15° to the right. More particularly, if it is assumed that the scene in which the face turns by 5° to the right corresponds to the tenth frame of the eighth video sequence whereas the scene in which the face turns by 15° to the right corresponds to the eighteenth frame of the eighth video sequence and three frames can be read out in one reading out operation, then the twelfth, fifteenth and eighteenth frames of the eighth video sequence are read out. It is also possible to read out across a plurality of video sequences, and when it is intended to read out three frames beginning with the fourth frame of the fifth video sequence and ending with the fifth frame of the sixth video sequence, for example, the fourth frame of the sixth video sequence, the fourth frame of the sixth video sequence and the fifth frame of the sixth video sequence are read out.

Figure 7:
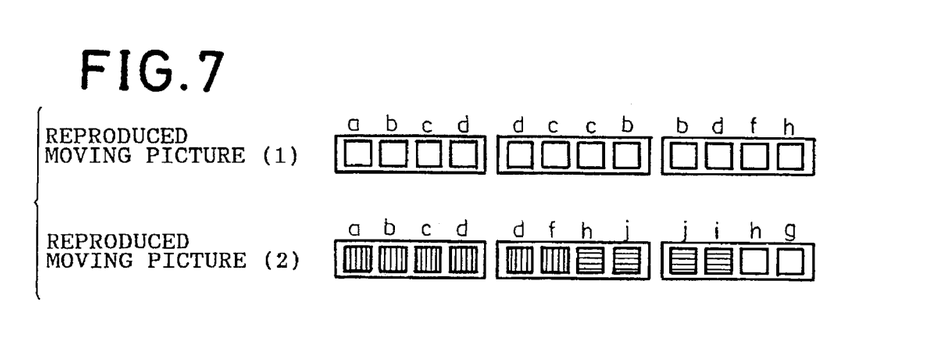
FIG. 7 is a diagrammatic view illustrating reproduction of moving pictures using the video sequences illustrated in FIG. 6.

FIG. 7 shows examples of a reproduced moving picture. Referring to FIG. 7, the example (1) is reproduced moving pictures obtained by reading out, in a first reading operation, four frames a, b, c and d of the video sequence VS1 illustrated in FIG. 6, reading out, in a second reading operation, four frames of d, c, c and b from the same video sequence VS1 and then reading out, in a third reading operation, four frames of b, d, f and h from the same video sequence VS1 and finally composing the thus read out frames. The example (2) is different reproduced moving pictures obtained by reading out, in a first reading operation, four frames a, b, c and d from the video sequence VS3 illustrated in FIG. 6, reading out, in a second reading operation, two frames d and f from the video sequence VS3 and two frames h and j from the video sequence VS2, and reading out, in a third reading operation, two frames j and i from the video sequence VS2 and two frames h and g from the video sequence VS1 and finally composing the thus read out frames.

Figure 2:
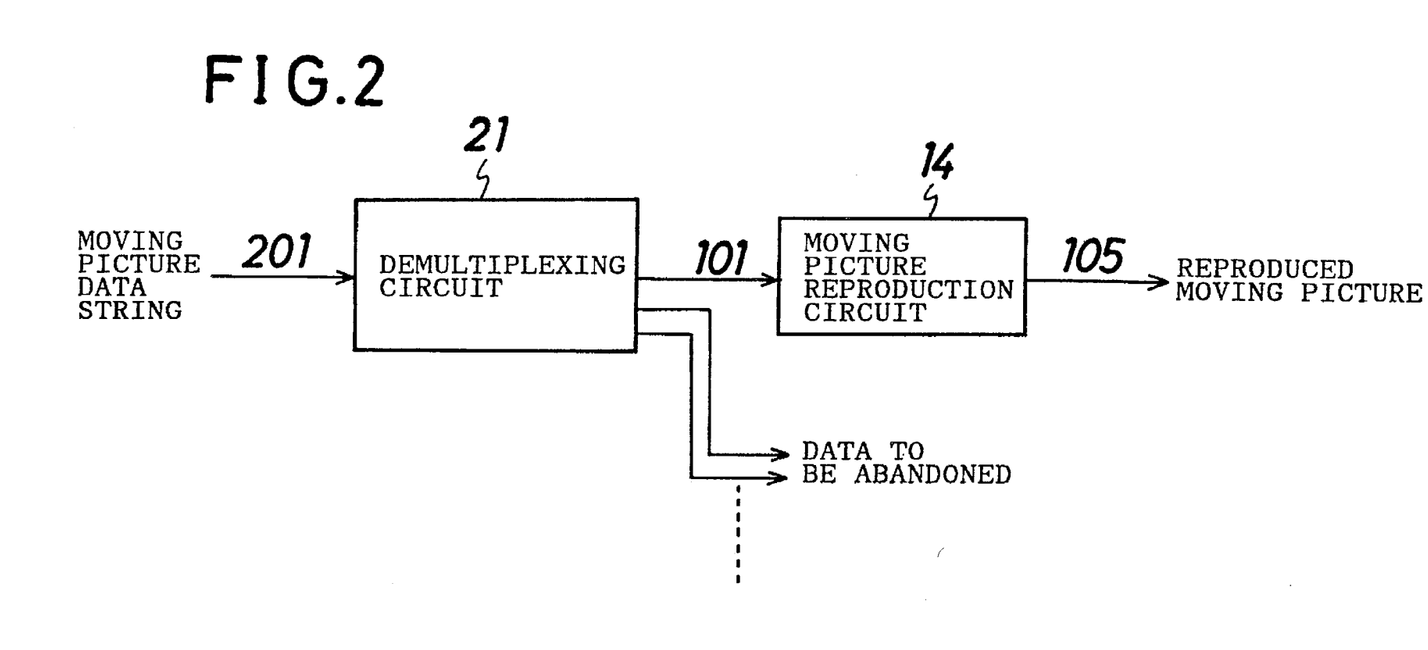
FIG. 2 is a block diagram showing another moving picture reproduction apparatus to which the present invention is applied.

Referring now to FIG. 2, there is shown another moving picture reproduction apparatus to which the present invention is applied. The moving picture reproduction apparatus shown is constructed so as to produce a moving picture 105 from a moving picture data string 201 constituted from coded data including motion information and is a modification to and different from the moving picture reproduction apparatus described hereinabove with reference to FIG. 1 only in that it includes a demultiplexing circuit 21 in addition to the moving picture reproduction circuit 14 shown in FIG. 1. The demultiplexing circuit 21 analyzes an inputted moving picture data string 201 including motion information to extract only the motion information 101 included in the moving picture data string 201 while abandoning the other data which describe, for example, the brightnesses or the colors. The motion information 101 thus extracted is sent to the moving picture reproduction circuit 14, by which a moving picture 105 is reproduced from the motion information 101.

The moving picture data string 201 including motion information may be moving picture codes which include, in coded data thereof, motion information produced from an existing encoder such as, for example, a bit stream defined in the ITU-T H.261 or a bit stream of the MPEG (Moving Picture Expert Group).

It is to be noted that the moving picture data string 201 including motion information may be a sound signal or a text signal including information from which a movement of a moving picture can be estimated. In this instance, the demultiplexing circuit 21 analyzes the sound or text, extracts description regarding a movement of an object to be reproduced and produces motion information 101 from the thus extracted description. The operation of the moving picture reproduction circuit 14 after production of the motion information 101 is similar to that for reproduction from moving picture codes described hereinabove. For example, in the example of a television telephone, the moving picture reproduction circuit 14 identifies a video sequence or sequences in which the mouth moves from another video sequence or sequences in which the mouth does not move based on motion information produced by the demultiplexing circuit 21.

Further, the moving picture data string 201 including motion information can handle even a signal, which is a combination of moving picture codes produced by the existing encoder described above and a sound signal and/or a text signal including information from which a movement of a moving picture can be estimated, in a similar manner.

Figure 3:
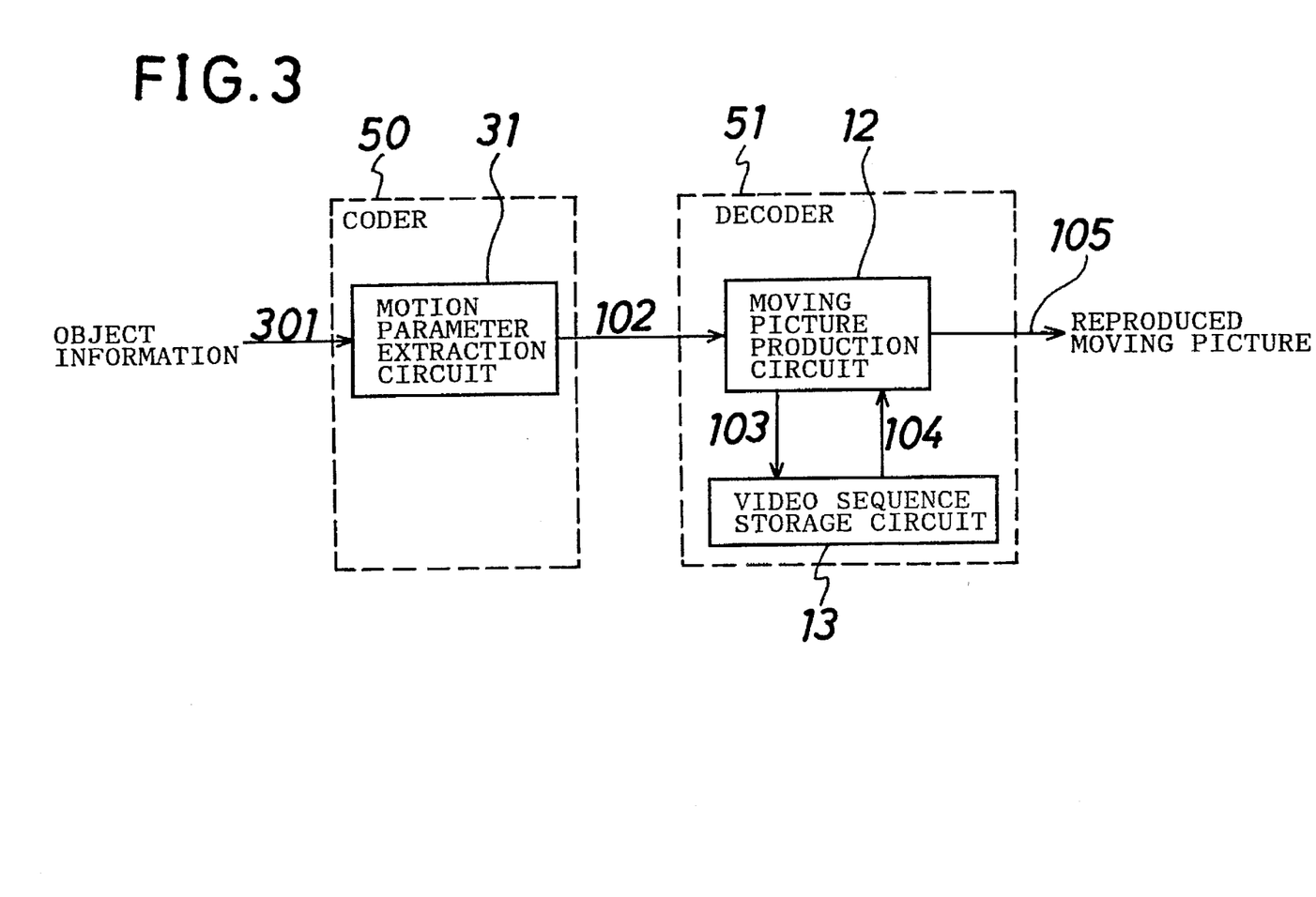
FIG. 3 is a block diagram showing a moving picture coding and decoding system to which the present invention is applied.

Referring now to FIG. 3, there is shown a moving picture coding and decoding system to which the present invention is applied. The moving picture coding and decoding system is constructed so as to reproduce a moving picture 105 from object information 301 representing a movement of an object and includes a coder 50 and a decoder 51. The coder 50 includes a motion parameter extraction circuit 31 while the decoder 51 includes a video sequence storage circuit 13 in which a plurality of video sequences which are various series of moving pictures are stored, and a moving picture production circuit 12 for reading out a video sequence or sequences necessary to reproduce a moving picture from the video sequence storage circuit 13 in accordance with a motion parameter or parameters sent thereto from the coder 50 and reproducing a moving picture using the thus read out video sequence.

The object information 301 to be inputted is, for example, fragmentary pictures representing a movement of an object, an output of a sensor which measures a movement of an object, picture information fetched from a mark applied to an object, information for production of computer graphics, sound information and/or text information.

The motion parameter extraction circuit 31 analyzes the inputted object information 301, extracts a small number of motion parameters 102 representing a movement of the object from the object information 301 and transmits or stores the motion parameters 102. The parameter extraction method may be such that, when a picture is inputted, motion information is extracted using block matching which is frequently employed in an interframe prediction coding apparatus and then motion parameters are extracted from the motion information in such a manner as described hereinabove in connection with the moving picture reproduction apparatus of FIG. 1.

In the meantime, when a plurality of sensor outputs obtained upon measurement of a movement are inputted, the direction and the amount of a movement calculated from the thus inputted sensor outputs are determined as motion parameters.

On the other hand, when sound or a text signal is inputted, a moving condition of the mouth or some other part is detected based on presence or absence of a sound signal and is determined as motion parameters, or a keyword corresponding to a particular movement included in the sound or the text signal is extracted by speech recognition or a text analysis technique and contents of a movement signified by the keyword are determined as motion parameters.

The motion parameters 102 from the coder 50 are sent to the moving picture production circuit 12 of the decoder 51. The moving picture production circuit 12 produces a moving picture 105 in accordance with the motion parameters 102 in a similar manner as in the moving picture reproduction apparatus of FIG. 1.

Figure 4:
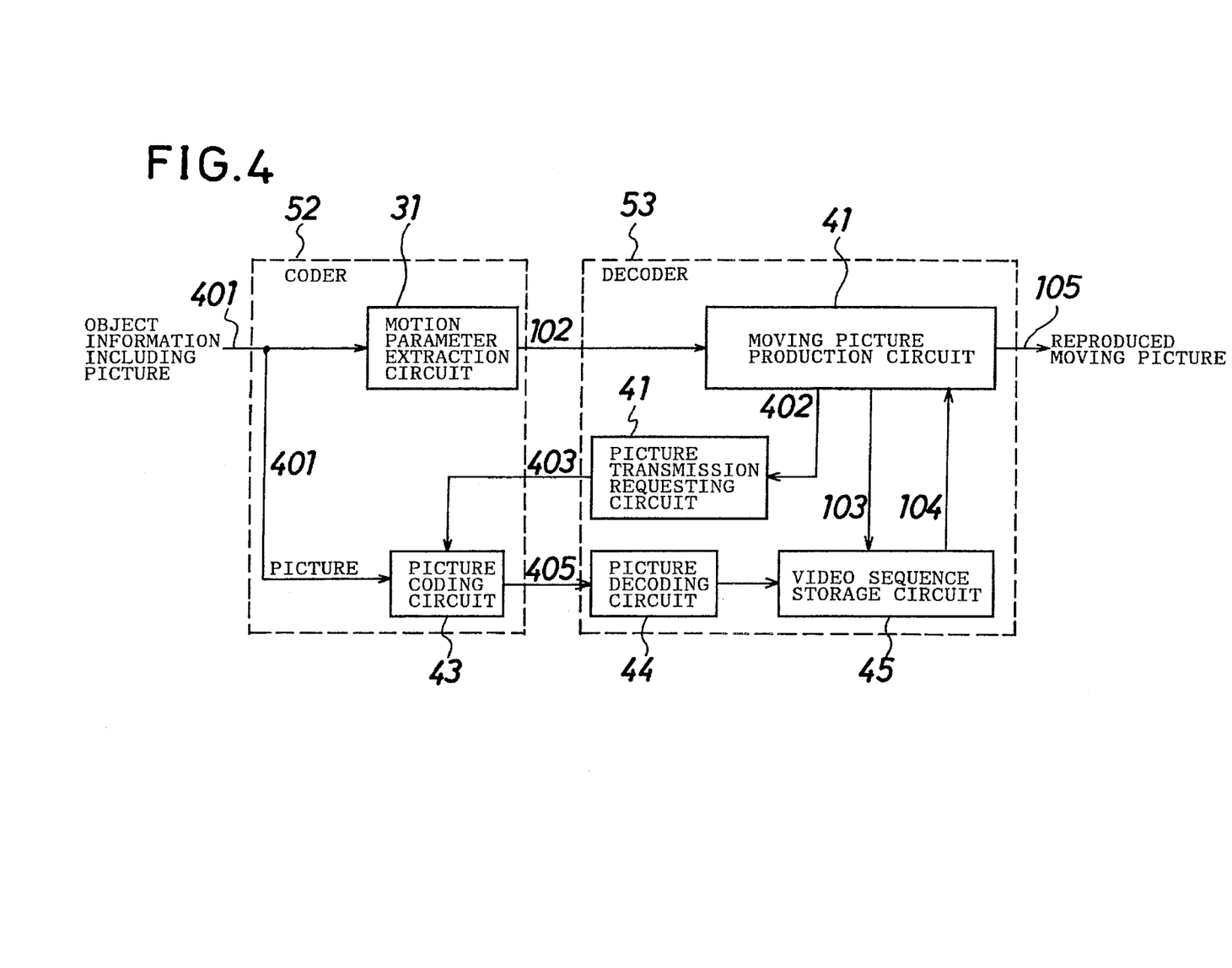
FIG. 4 is a block diagram showing another moving picture coding and decoding system to which the present invention is applied.

FIG. 4 shows another moving picture coding and decoding system to which the present invention is applied. The moving picture coding and decoding system shown is a modification to and different from the moving picture coding and decoding system of FIG. 3 only in that it additionally includes means for newly producing and storing a video sequence which has not been registered as yet. In particular, a coder 52 of the moving picture coding and decoding system shown in FIG. 4 includes a motion parameter extraction circuit 31 for extracting a motion parameter or parameters from object information including an inputted picture, and a picture coding circuit 43 for coding a video sequence from the object information including the inputted picture. Meanwhile, a decoder 53 includes a video sequence storage circuit 45, a moving picture production circuit 41 for reading out a video sequence or sequences necessary to reproduce a moving picture from the video sequence storage circuit 45 and reproducing a moving picture from the video sequence or sequences in accordance with motion parameters 102 sent thereto from the coder 52, a picture transmission requesting circuit 42 for requesting a video sequence which is not registered in the video sequence storage circuit 45 to the coder 52, and a picture decoding circuit 44 for decoding codes of a video sequence or sequences sent thereto.

The motion parameter extraction circuit 31 extracts a motion parameter or parameters 102 from object information 401 including a picture in accordance with a method similar to that employed by the moving picture coding and decoding system shown in FIG. 3, and outputs the motion parameter or parameters 102 to the decoder 53.

In the decoder 53, the moving picture production circuit 41 produces a moving picture 105 in a similar manner as in the example described hereinabove.

The moving picture production circuit 41 provides a read control signal 103 to the video sequence storage circuit 45. When a video sequence corresponding to the read control signal 103 is not registered in the video sequence storage circuit 45 as yet, the moving picture production circuit 41 outputs to the picture transmission requesting circuit 42 a notification signal 402 which indicates that the video sequence is not registered as yet. Upon reception of the notification signal 402, the picture transmission requesting circuit 42 outputs a picture transmission requesting signal 403 to the picture coding circuit 43 of the coder 52.

When the picture transmission requesting signal 403 is inputted, the picture coding circuit 43 codes a picture 404 extracted from the object information 401 in accordance with a conventional coding method such as interframe prediction coding and outputs coded data 405 of the picture 404 to the picture decoding circuit 44 of the decoder 53. The picture decoding circuit 44 decodes the thus inputted coded data 405 in accordance with a conventional decoding method such as interframe prediction coding to produce a video sequence 406 and stores the video sequence 406 into the video sequence storage circuit 45.

Having now fully described the invention, it will be apparent to one of ordinary skill in the art that many changes and modifications can be made thereto without departing from the spirit and scope of the invention as set forth herein.

What is claimed is:

1. An apparatus for reproducing moving pictures from motion parameters, comprising:

motion parameter extraction means for extracting a motion parameter from motion information of an inputted picture;

video sequence storage means for having stored in advance a plurality of video sequences which are a series of moving pictures individually corresponding to a plurality of motion parameters; and moving picture production means for reading out, in accordance with the motion parameter extracted by said motion parameter extraction means, a corresponding video sequence from said video sequence storage means and producing a reproduced moving picture from the corresponding video sequence.

2. An apparatus for reproducing moving pictures from motion parameters as claimed in claim 1, further comprising means for analyzing a moving picture data string including inputted motion information to extract only the motion information included in the moving picture data string while abandoning other information of the moving picture data string.

3. A system for coding and decoding moving pictures from motion parameters, comprising:

a coder including motion parameter extraction means for extracting a motion parameter from object information of an inputted picture; and a decoder including video sequence storage means for having stored in advance a plurality of video sequences which are a series of moving pictures individually corresponding to a plurality of motion parameters, and moving picture production means for reading out, in accordance with the motion parameter extracted by said motion parameter extraction means, a corresponding video sequence from said video sequence storage means and producing a reproduced moving picture from the thus read out video sequence.

4. A system for coding and decoding moving pictures from motion parameter as claimed in claim 3, wherein said coder further includes picture coding means for coding a picture included in inputted object information, and said decoder includes requesting means for requesting a video sequence to be stored into said video sequence storage means to said picture coding means, and picture decoding means for decoding the video sequence coded by said picture coding means and storing the thus decoded video sequence into said video sequence storage means.

5. A method of reproducing moving pictures from motion parameters, comprising the steps of:

(a) storing, in advance of step (b), a plurality of video sequences, each of said video sequences having a plurality of frames;

(b) receiving an inputted picture having motion information;

(c) extracting motion parameters from the motion information of the inputted picture; and (d) producing a reproduced moving picture from the plurality of video sequences stored in step (a), in accordance with the motion parameters extracted in step (c).

6. A method of reproducing moving pictures from motion parameters as claimed in claim 5, wherein step (c) comprises the steps of:

(1) analyzing a moving picture data string, said moving picture data string including the motion information from the inputted picture, to extract only the motion information included in the moving picture data string; and (2) abandoning other information of the moving picture data string.

7. A method of reproducing moving pictures from motion parameters as claimed in claim 5, further comprising the steps of:

(e) providing a coder to perform steps (b) and (c); and (f) providing a decoder to perform steps (a) and (d).

8. A method of reproducing a moving picture from motion parameters as claimed in claim 7, further comprising the steps of:

(g) providing a picture coding circuit in said coder and a picture decoding circuit in said decoder;

(h) coding, in said picture coding circuit, a picture included in the inputted picture, to produce a coded picture;

(i) receiving, in said coder, a request from said decoder for the coded picture;

(j) outputting the requested coded picture from said coder to said decoder;

(k) receiving the coded picture in said decoder;

(l) decoding, in said picture decoding circuit, said received coded picture to produce a decoded video sequence; and (m) storing said decoded video sequence as one of said plurality of video sequences.

* * * * *